Figure 1:
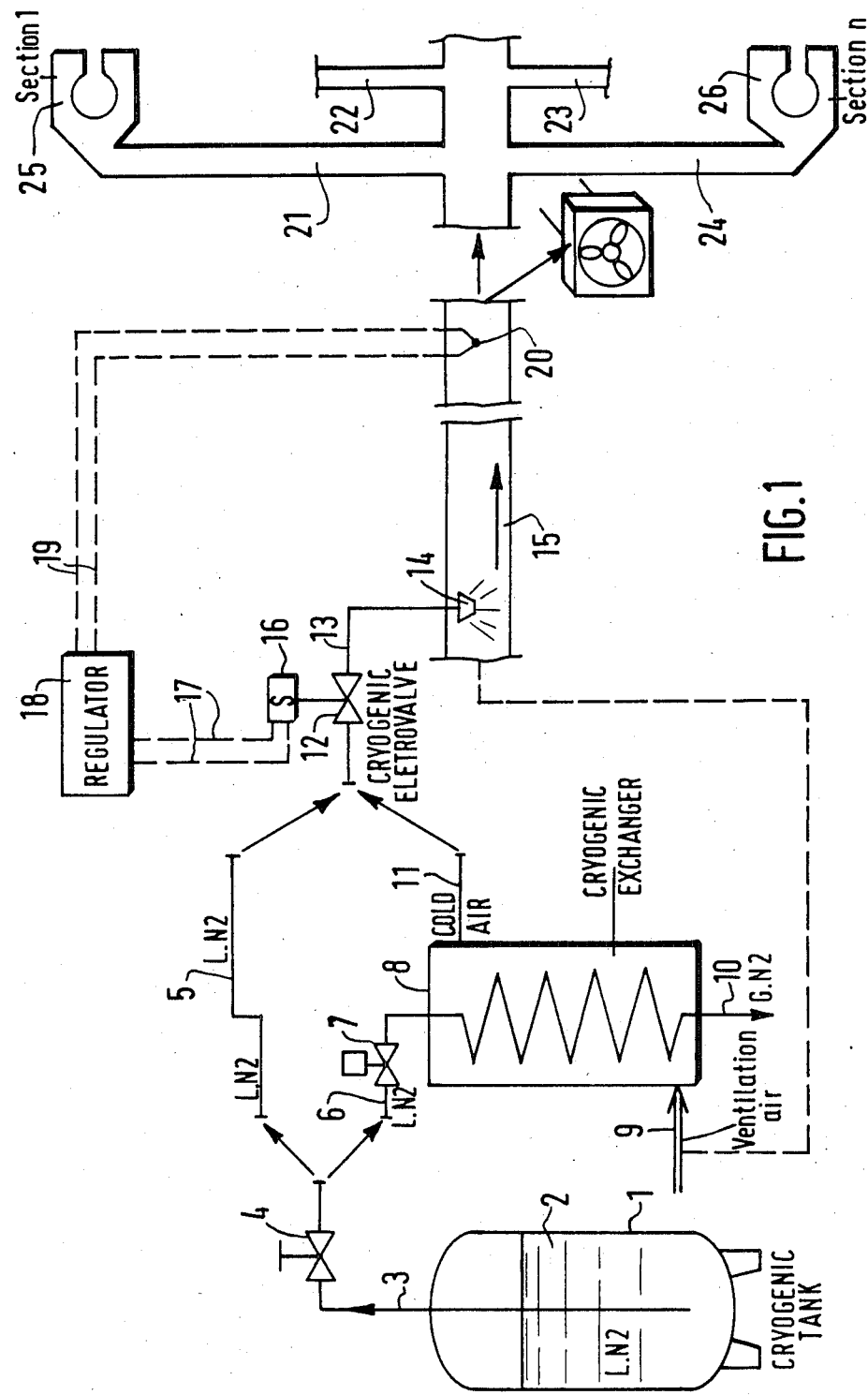

United States Patent [19]
Virey et al.

[11] Patent Number: 4,812,156
[45] Date of Patent: Mar. 14, 1989

[54] PROCESS FOR MANUFACTURING GLASS OBJECTS

[75] Inventors: Franck Virey, Paris; Daniel Goumy, Saint Egreve, both of France

[73] Assignee: L'Air Liquide, Paris, France

[21] Appl. No.: 134,327

[22] Filed: Dec. 17, 1987

[30] Foreign Application Priority Data

Dec. 18, 1986 [FR] France .............................. 86 17759

[51] Int. Cl.$^4$ .............................................. C03B 9/38
[52] U.S. Cl. ........................................ 65/83; 65/111; 65/265; 65/267; 65/319; 65/326; 65/162; 65/356
[58] Field of Search .................. 65/83, 111, 265, 267, 65/319, 326, 162, 356

[56] References Cited

U.S. PATENT DOCUMENTS

| | | | |
|---|---|---|---|
| 3,416,908 | 12/1968 | Goodwin et al. | 65/162 |
| 3,630,707 | 12/1971 | Ayers | 65/162 |
| 3,666,433 | 5/1972 | Nebelung et al. | 65/162 X |
| 3,854,921 | 12/1974 | Jones | 65/162 X |
| 4,557,744 | 12/1985 | Fenton et al. | 65/162 X |
| 4,708,730 | 11/1987 | Ziegler et al. | 65/265 X |

Primary Examiner—Arthur Kellogg
Attorney, Agent, or Firm—Lee C. Robinson, Jr.

[57] ABSTRACT

According to the invention, ventilating air blown around and/or in the walls of a mould is cooled so as to maintain substantially constant, at least during predetermined periods of time, the temperature of the air around and/or in the walls of the mould, irrespective of the ambient temperature.

29 Claims, 5 Drawing Sheets

PROCESS FOR MANUFACTURING GLASS OBJECTS

The present invention relates to a process for manufacturing a glass object in which a plurality of moulds are fed in succession with glass in the viscous liquid state, in which the parisons are shaped, then discharged from the mould, said moulds being cooled by blowing a gas such as air around the moulds and/or in the walls of the moulds.

The machines for manufacturing glass objects are fed with a parison of molten glass whose viscosity is such that this parison can assume its final shape within a given period of time depending on the manufacturing cycle. The glass parison arrives in the mould at a temperature higher than the working temperature and is then shaped within the mould either mechanically or by blowing, and then the glass article produced is discharged from the mould. When its temperature is lower than the temperature of deformation of the glass, it is then placed on a transfer belt which brings the articles into an annealing furnace or to any other intermediate machine.

During its formation, the glass object is put in contact with one or more moulds so as to be simultaneously shaped and cooled. Problems arise in respect of the shaped object when the glass is excessively cooled upon contact with the mould or when it is cooled too quickly or too unequally or also when it is not cooled enough. It is usually found that an excessive or unequal cooling results in corrugations on the skin of the glass articles, whereas an excessively rapid cooling results in glaze, i.e., initiations of fracture.

Lastly, an insufficient cooling causes adhesion of the glass to the walls of the mould and deformation of the glass articles produced.

The applicant has found that these various problems were due to a bad adjustment of the main parameters involved in the cooling of the glass, i.e., the temperature of the mould or moulds, the temperature of the glass, the time of contact between the glass and the mould and/or the pressure of contact between the glass and mould.

Among these various problems encountered, the invention provides a solution to the problem of the cooling of the mould and to the problem of the periods of contact between the glass and mould.

The temperature of the moulds varies cyclically in the course of manufacture. The amplitude of these variations decreases as one moves away from the surface in contact with the glass. It has been found that this temperature variation is substantially zero on the outer surface of the moulds.

However, it frequently occurs that a certain number of disturbances are added to these cyclic variations over a period of time. The applicant has found that these variations were due to variations in the exterior temperature of the air and/or of the unequal coolings from one mould to another and/or changes in the pressure of the cooling air.

Consequently, it appeared that the control of the temperature of the glass and consequently the temperature of the moulds and the cooling of the latter constitute essential factors if it is desired to ensure that no defects are produced in the glass articles in the course of their formation.

It is known from the article entitled "Automatic control of mold cooling wind" published in thereport of the "36th annual conference on glass problems", to control the pressure of the cooling air by the variations of the temperature of this air. Thus, when the temperature of the ambient air increases in the course of the day, for example, the pressure of the cooling air is increased and consequently the rate of flow of the latter is increased while, when the ambient temperature drops, for example in the wintertime or during the night, the pressure of the cooling air and therefore the rate of flow of the latter is reduced. According to the results indicated in this article, this process improves the cooling of the moulds on average, in the course of time, without however providing a solution of the problem posed by the various disturbances mentioned hereinbefore. In the aforementioned technique, the cooling air is usually produced by a powerful ventilation which provides a circulation of air at a high rate of flow around the manufacturing machine.

It is also known to effect an axial cooling of the moulds by means of a circulation of air in internal passageways in the moulds whose geometry is appropriate to the article to be manufactured.

Such a process certainly results in an improvement in the manufacturing outputs in certain cases, in that it possibly permits a manufacture having less defects, but it has the drawback of requiring special moulds whose passageway geometry must be adapted to each mould and therefore to each object to be produced. This still further increases the cost of manufacture of the moulds which is already high and this moreover requires a development of each of these moulds in order to achieve a good optimization of the cooling.

It has moreover been found that the processes examined hereinbefore suffer from a certain inertia due essentially to the limitations of the air flows, bearing in mind the limited power of the fan or fans and pressure drops.

The present invention proposes in particular to control the temperature of the moulds, the internal temperature peaks of the moulds, to vary the rate of cooling of the moulds in the course of a given cycle by a very rapid regulation of the temperature of the air or of the cooling fluid. It also proposes to control the cooling of the moulds which may be identical or different from one cycle to the other, or identical or different from one mould to the other in a manufacturing machine having a plurality of sections.

The process according to the invention comprises cooling the ventilating air blown around and/or in the walls of the mould in such manner as to maintain substantially constant, at least during predetermined periods of time, the temperature of the air blown around and/or in the walls of the moulds, irrespective of the ambient temperature.

Preferably, the temperature of the ventilating air will be measured and compared with a set value which is constant or variable in the course of a cycle, constant or variable on average over a period of time involving a large number of cycles, the difference between the measured temperature and the set temperature, when it is positive, causing the ventilating air to be put in contact with a cryogenic fluid and/or heat exchanging means and/or a cold gas whose temperature is lower than the set temperature, so as to, if necessary, lower the temperature of the ventilating air to around the set temperature.

Figure 2:
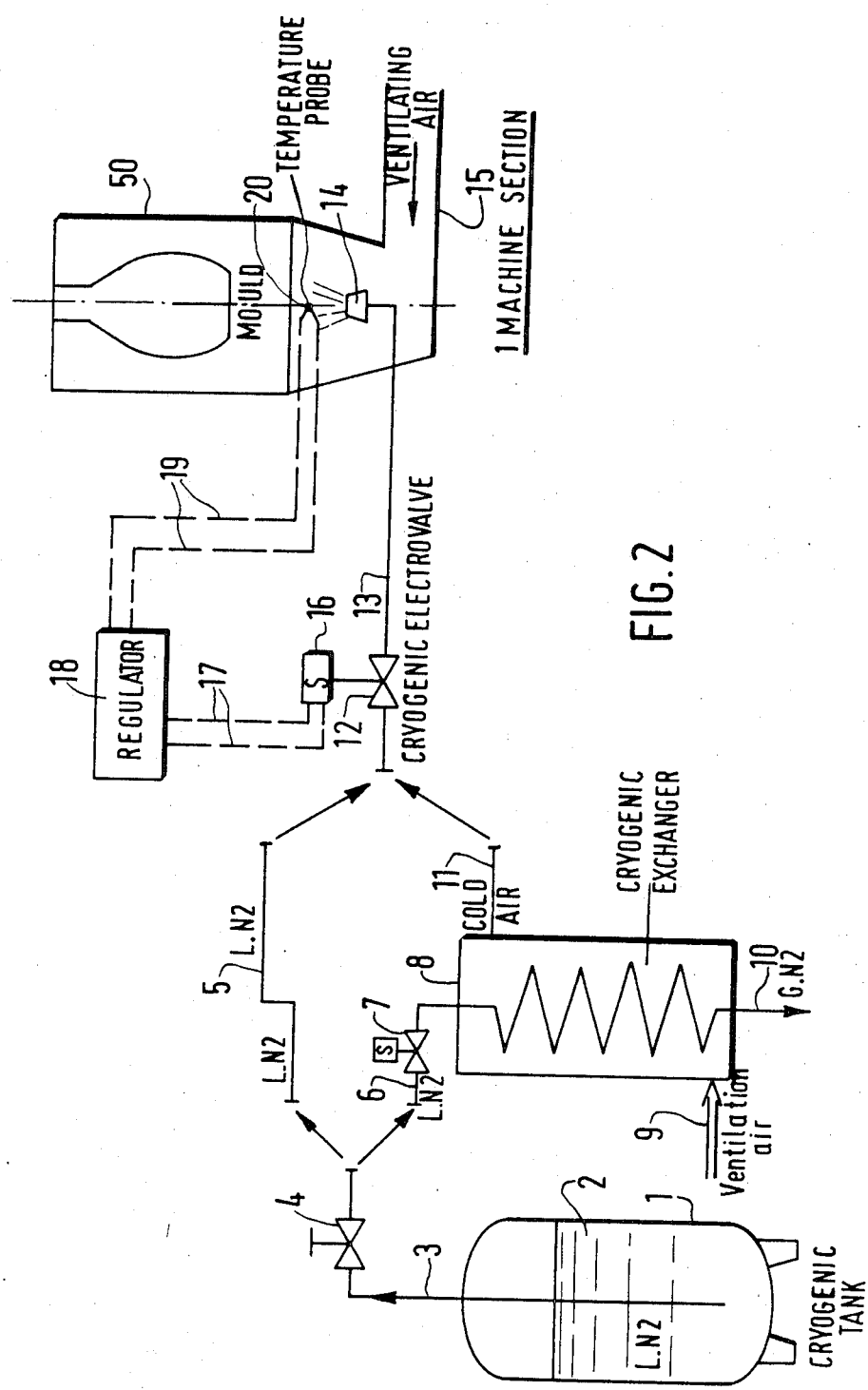
Figure 3:
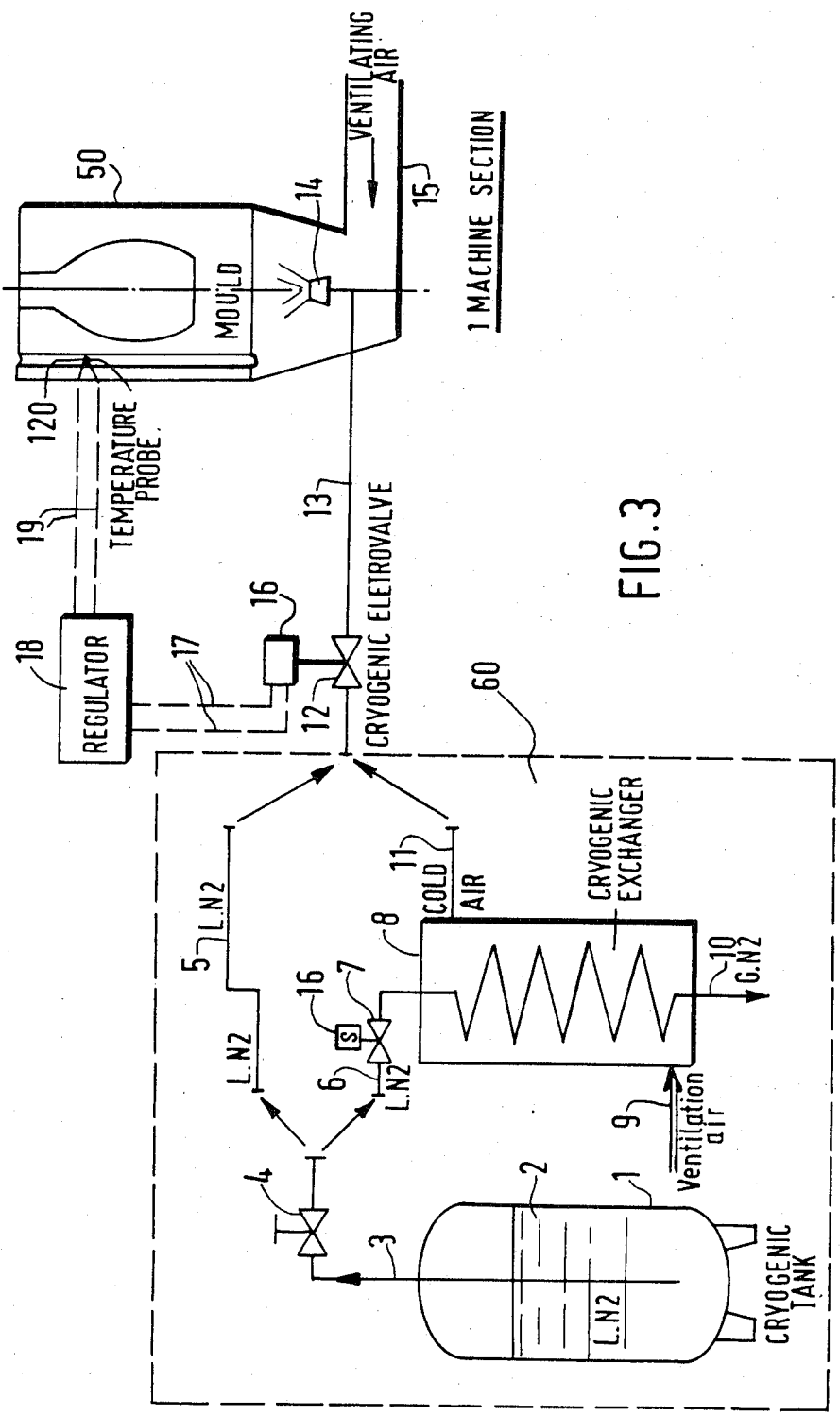
Figure 4:
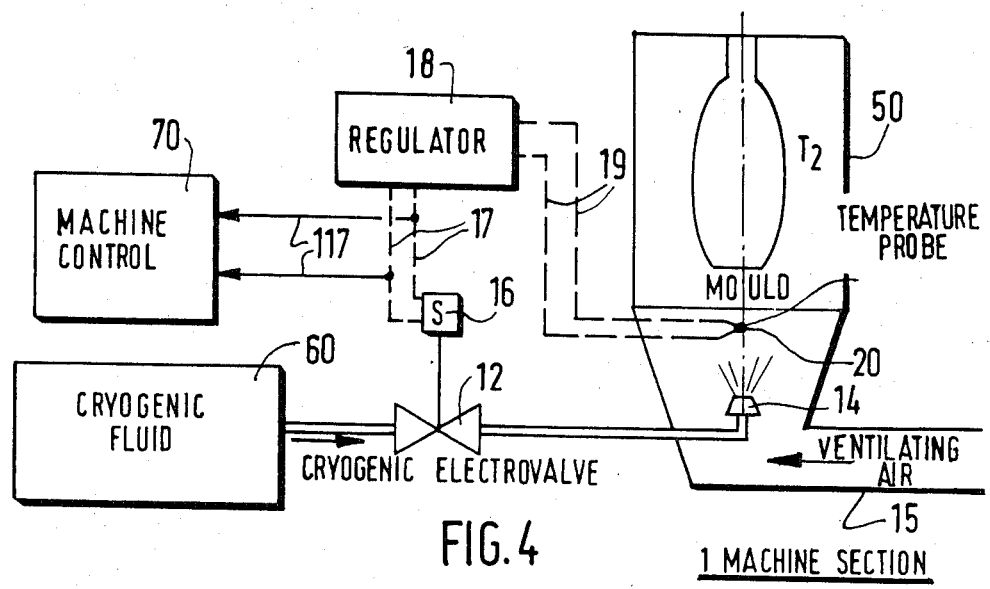
Figure 5:
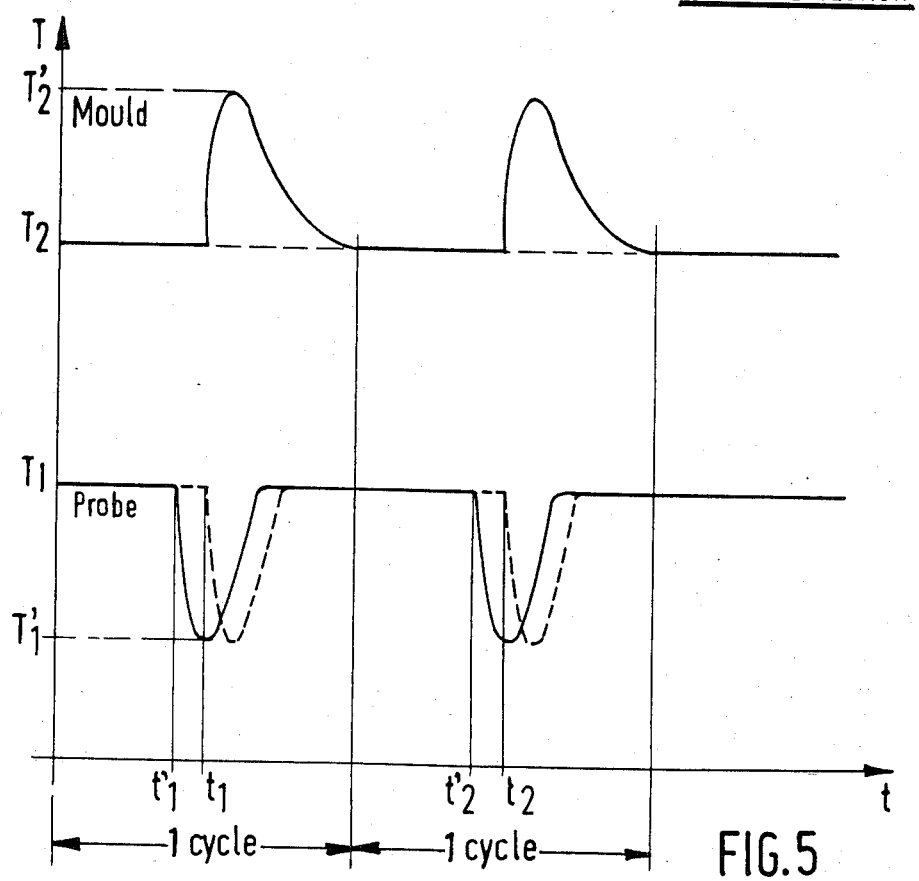
Figure 6:
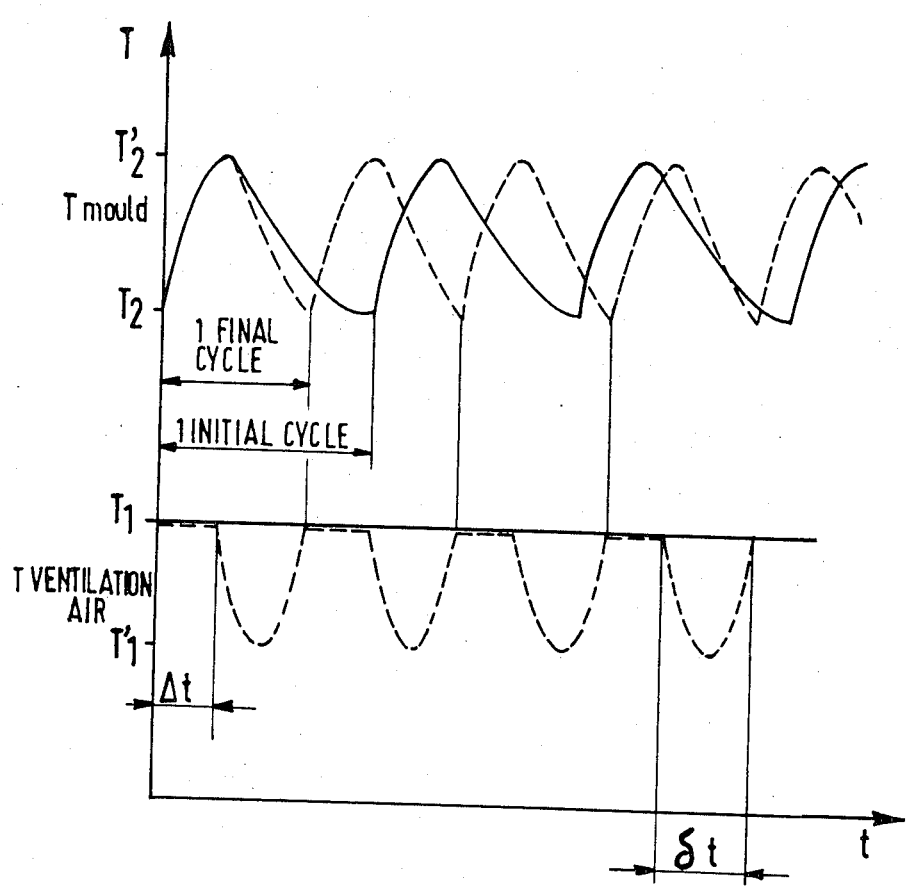

A better understanding of the invention will be had from the following embodiments given as non-limitative examples with reference to the accompanying figures in which:

FIG. 1 shows an embodiment of the invention in which the temperature of the air for ventilating moulds is controlled, FIG. 2 shows a second embodiment of the invention in which the temperature of the mould ventilating air is controlled in the region of each of the moulds, FIG. 3 shows a variant of the embodiment of FIG. 2, in which the temperature is regulated in the region of the wall of the mould, FIG. 4 shows a particularly advantageous embodiment of the invention in which the freezing power is varied in the course of a glass object forming cycle, FIG. 5 shows the evolution with respect to time of temperature of the mould and of the temperature of the probe measuring the temperature of the ventilating air in the embodiment shown in FIG. 4, and FIG. 6 is a variant of the diagram shown in FIG. 5.

FIG. 1 shows an embodiment of the invention for controlling the ventilating air of moulds. In this figure, the cryogenic tank 1 containing a cryogenic liquid 2, for example liquid nitrogen, is connected through the pipe 3 and the valve 4 either, in accordance with the first embodiment, through the pipe 5 directly to the cryogenic electrovalve 12, or, in accordance with the second embodiment, to the cryogenic electrovalve 7, whose outlet is connected to a heat exchanger 8 which delivers to the atmosphere at its lower outlet (as viewed in the figure) the vaporized gas, while the ventilating air 9, issuing for example from a compressed air generator, is introduced at the base of the cryogenic exchanger 8 and escapes in the upper part of the latter through the pipe 11 which conducts it to the cryogenic electrovalve 12. The latter is connected through the pipe 13 to a vaporization nozzle 14 which vaporizes the liquefied gas or injects the cooled air (or another cold carrying gas) into the ventilating air pipe 15. The latter is divided into a plurality of pipes 21, 22, 23, 24, etc., each of them being connected to a mould or to a section of the moulding machine ("section" is intended to mean, in the machines of this type, the roughing and finishing moulds). In another embodiment, the cooled ventilating air is conducted into the fan 24 which ventilates the exterior of the moulds such as 25, 26 (respectively connected, in the figure, to the pipes 21, 24 which are connected to the central cooling air pipe 15). It will be understood that, according to the embodiment shown in FIG. 1, the cooled air may be either injected through the pipe 15 into each of the moulds such as 25 or 26, or injected into the fan 24, but it is also possible to effect these cooling operations simultaneously (simultaneous cooling of the air blown by the fan around the moulds and of the air blown inside each mould).

The solution disclosed in this figure concerns the simplest embodiment of the invention. It provides a solution of the problem related to the variations of temperature between the day and night, summertime and wintertime, etc., and increases the efficiency of the machine.

In carrying out this solution, there are two embodiments. According to a first embodiment, the whole of the ventilating air of one or more machines is treated in an exchanger supplied with cryogenic fluid such as liquid nitrogen, liquid hydrogen, liquid carbon dioxide and liquid oxygen, liquid helium, liquid argon, etc. According to this first embodiment, the temperature probe 20 measures the temperature of the ventilating air and the regulator 18 then causes the opening or the closing of the valve 16 so as to inject the cold air coming from the exchanger 8 at a predetermined temperature. The dimensions of this exchanger will be adapted to the desired rate of flow. Another embodiment comprises in the injection of a cryogenic fluid, such as liquid nitrogen, liquid carbon dioxide, liquid helium, etc., into the ventilating air pipe on the upstream side of the machine or machines, the temperature being maintained by positioning a temperature probe on the downstream side of the injection, after homogenization of the mixture, piloting with the regulator 18 the injections of cryogenic fluids. The temperature is measured by the temperature probe 20 placed in any suitable point in the pipe 15, at a varying distance from the injection nozzle 14, this temperature probe being connected by the connections 19 to the regulator 18 which, when the temperature of the ventilating air of the pipe 15 is higher than the set temperature, delivers a signal to the electric connections 17 for causing the opening of the cryogenic electrovalve 12 by means of its control device 16. The regulator 18 may operate in accordance with two distinct modes: a first mode consists in sampling the temperature of the ventilating air in the pipe 15 at regular intervals. If this temperature is lower than or equal to the set temperature, no control signal is sent to the electrovalve 12. If the temperature is higher, this valve, whose predetermined rate of flow is known, is opened during a fixed period of time less than the sampling period. Then each sampling measurement is recommenced. A second mode consists in effecting a quasi-continuous measurement of the temperature of the ventilating air by a sampling at a much higher frequency than in the first mode. When the temperature of the ventilated air is higher than that of the set value, the cryogenic valve 12 is opened and allows adequate fluid to pass through until the temperature measured by the probe 20 becomes lower than or equal to the set value. The cryogenic valve 12 is then closed.

It will be understood that it is also possible to employ temperture regulation of the "proportional" type or of the P.I.D. type by means of adapted valves, but these solutions have often been found to be too expensive for the profitability of the process, or delicate to employ. Inversely, much simpler solutions may also be employed by using a temperature probe 20, 120 of the bimetallic type which supplies electric curret of the electrovalve 12 when the measured temperature is higher than the set temperature, thereby opening the cryogenic valve 12 and cutting off the electric supply to the electrovalve 12 when the measured temperature is lower than or equal to the set temperature, thus closing the electrovalve 12.

FIG. 2 shows an embodiment of the invention which may be used alone or in combination with the embodiment shown in FIG. 1. In this FIG. 2, the same elements a those of FIG. 1 carry the same reference characters. The cold air issuing from the cryogenic exchanger 8 or the liquified gas supplied through the pipe 5, passes through the cryogenic electrovalve 12 under the control of the regulator 18. The regulator 18 receives temperature information from the temperature probe 20 which is placed in the present case close to the cryogenic injection nozzle 14 which is itself placed in the pipe supplying ventilating iir to the moulds, just below or in proximity to this mould. The temperature probe is also in proximity to the injection nozzle 14 and the mould 50.

The control of the temperature level of the whole of the ventilating air in the course of time such as explained with reference to FIG. 1 enables the efficiency of the machine to be increased. However, in some cases, there are found in the region of each section of a machine mould temperature differences due for example to variations in the pressure drop (different pipe lengths, clogging of the orifices in the region of the moulds, etc.), and the section or sections operating under less good conditions will reduce the efficiency of the machine. The embodiment disclosed in FIG. 2 permits a control of the temperature in the region of each mould, i.e., in the region of each section of a machine.

According to one arrangement in accrodance with this embodiment, a cryogenic fluid, such as liquid nitrogen, liquid carbon dioxide, liquid helium, etc., may be injected into the ventilating air circuit just upstream of the mould. The temperature probe is placed in proximity to the cryogenic injection, and after homogenization of the temperature, piloting, by means of the regulator 18 the opening and closing cycles of the cryogenic valve 12.

The required addition of cold may be obtained by injecting a gas, for example air, previously cooled in a cryogenic exchanger fed with a fluid such as liquid nitrogen, liquid argon, iquid carbon dioxide, liquid oxygen, liquid hydrogen, liquid helium, etc. The control of the temperature will be achieved in the same way as that described hereinbefore. Such a solution presents the advantage of using a cooling fluid such as oxygen or hydrogen.

The structure shown in FIG. 3 represents another embodiment of the invention in which the same elements as the elements of the preceding figures carry the same reference characters. In this embodiment, the temperature probe is no longer placed in proximity to the injection of cryogenic fluid nozzle 14 but is placed within the walls of the mould 50. This probe 120 is connected, as before, to the regulator 18 through electric lines 19.

Such an embodiment enables the production of the machines to be increased. Indeed, according to this embodiment, the temperature of the moulds is lowered with optimum speed to such value that the cooling times are reduced without modifying the quality of the article.

Tests have shown that production by at least 5% for a lowering of 10° C. of the temperature of the ventilating air leaving the mould without reducing the efficiency of the machine.

FIGS. 4 and 5 explain a particularly advantageous embodiment of the invention in which the freezing power injected into the mould may be programmed so as to improve the productivity and the quality of the glass article produced. In these figures, the same elements as those of the preceding figures carry the same reference characters. The cryogenic fluid or cooled air is created in the same way as before by the unit carrying the reference character 60. In this embodiment, the temperature probe is placed as in the case of FIG. 2 in proximity to the cryogenic fluid or cooled air injection nozzle 14, below the mould 50. The electric lines 17 connecting the regulator to the control means 16 of the cryogenic electrovalve 12 are also connected to the electric lines 117 which are connected to the means controlling the production machine 70. The operation of the devices of FIG. 4 will be understood better with the aid of FIG. 5 in which there are seen in the upper part a curve representing the temperature variations T2 of the walls of the mould as a function time and in the lower part of a curve representing the variations in the temperature T1 measured by the probe 20. Before pouring a parison element into the mould, the temperature of the latter is at a value T2. This value suddenly increases when the glass arrives in the mould in a viscous liquid state, up to the value T'2, then drops a little more slowly until the glass element is extracted from the mould, which represents one cycle in FIG. 5.

According to a first embodiment, the machine control means 70 causes, upon the pouring of the parison element at instant t1, the opening of the cryogenic electrovalve 12 which permits the injection of a predetermined quantity of cryogenic fluid or cold gas through the nozzle 14, which causes the temperature of the probe to drop from the value T1 to T' 1 which is distinctly lower (on the order of about 50° C. to 150° C). The larger the temperature difference the faster the temperature drop (it is for example possible to obtain a substantially constant temperature of the mould T2—in dotted lines in the upper part of FIG. 5). Then the temperature of the probe rapidly rises to the value T1. Note that the variations in the temperature of the probe and of the mould occur substantially during the same lapse of time.

According to a preferred embodiment of this example of FIG. 4, the arrival of the parison element in the mould is anticipated by injecting at instant t' 1, prior to the instant t1, cryogenic liquid or cold air through the nozzle 14, the cryogenic electrovalve 12 having its opening brought about by the machine control means 70. As before, a predetermined quantity of cryogenic liquid or cold gas is injected. In practice, this signifies that the cryogenic electrovalve is opened during a predetermined interval of time so as to deliver a predetermined quantity of cold.

During one production cycle, the temperature of the mould does not remain constant. Indeed, there is a sudden rise in temperature at the moment the glass comes into contact with the cavity of the mould during the glass object forming and cooling stage. According to a variant of the invention, it was realized that this temperature peak, which was inevitable before the present invention, must be of an amplitude and period which are as small as possible, since it limits the quality, i.e., the mechanical properties of the glass object.

According to the invention, the improvement in the parameters of production output and quality of the finished product is achieved by injection of a freezing power which is variable during the period of a cycle (see FIG. 5), the temperature of the mould being maintained optimum and constant throughout the duration of the cycle at a value T2. This operation is effected by the regulator 18 and the temperature probe 20. These two elements control the opening and the closure of the cryogenic electrovalve 12 through the elements 16 and 17. In order to neutralize the rise in temperature of the mould during the forming stage, the machine control means 70 delivers a control signal at instant t1 causing the opening of the cryogenic valve for a period of time which is a function of the nature of the article to be produced (according to its size, shape, etc.).

The instant t1 may correspond to the instant at which the glass comes into contact with the mould (according to the embodiment in dotted lines in FIG. 5), but it may also be prior thereto (t'1), thereby taking into account time constants due to the nature of the materials employed (mouldglass) glass)

This function is performed in FIG. 4 by a single valve 12, but in some cases it will be necessary to separate the various functions by means of a plurality of valves. It will be understood that the device of FIG. 4 is identical for each of the moulds and/or the sections of the machine, with a staggering of the control times.

According to another embodiment shown in FIG. 6, the rate of cooling of the moulds may be also increased when the latter are not in contact with the glass so as to bring them more rapidly to the initial conditions of temperature T2, thereby reducing the waiting times which slow down the production rates. At the time the mould is at temperature T'2 and the glass article is discharged, an injection of cold is programmed by the control means 70 during a period of time δt thus enabling the moulds to return to the initial temperature T2 more rapidly. It will therefore be possible to reduce the total cycle time and thus improve productivity. When it is desired to reduce δt, the temperature T'1 will be lowered, i.e., the injected freezing power will be increased. The increase in this injected freezing power will however be limited by the performances of the machine. The continuous lines in this figure concern the initial cycle (without cryogenic injection), while the dotted lines concern the final cycle (with cryogenic injection), i.e., with an increase in productivity. In this FIG. 6, Δt represents the interval of time of glass-/mould contact while δt represents the interval of time during which the cryogenic fluid may be injected.

It is also possible, as before (FIG. 5), to anticipate the cryogenic injection in order to take into account problems of thermal diffusibility related to the materials of the mould.

It must be understood that the cooling of the ventilating air (in all of the foregoing embodiments) may be effected, in the known manner, by mechanical or thermodynamic cooling means (freezing unit, air or water heat exchangers, etc.).

We claim:

1. A process for manufacturing glass objects comprising cyclically feeding a plurality of moulds in succession with parison elements of glass in a viscous liquid state, shaping and then discharging the shape parison elements from the moulds, feeding ventilating air to said moulds to cool said moulds, measuring the temperature of said air, comparing the measured temperature with a set temperature, and, when the measured temperature is higher than the set temperature, causing injection and intimate mixing of a cold fluid directly into said ventilating air so as to maintain substantially constant, at least during predetermined periods of time, the temperature of the air on the moulds irrespective of the ambient temperature, wherein said cold fluid has a temperature substantially less than the ambient temperature.

2. A process according to claim 1, wherein said cold fluid is a cryogenic fluid and said cryogenic fluid is injected in the ventilating air in a continuous manner.

3. A process according to claim 1, wherein said cold fluid is a cryogenic fluid and said cryogenic fluid is injected in the ventailating air in a sequential manner.

4. A process according to claim 1, comprising cooling the ventilating air for the plurality of moulds to the same temperature.

5. A process according to claim 1, comprising feeding the ventilating air to the moulds through separate pipes, measuring the temperature of said air in the vicinity of each mould, comparing the measured temperature with a set temperature and injecting a cooling fluid in the ventilating air in the region of each pipe when said measured temperature is less than said said temperature.

6. A process according to claim 5, wherein the set temperature in the region of each mould is identical.

7. A process according to claim 5, wherein the set temperatures in the region of each mould is different.

8. A process according to claim 5, comprising measuring the temperature in the neighborhood of each mould or by measuring the temperature of the ventilating air just before said ventilating air reaches the mould.

9. A process according to claim 5, comprising measuring the temperature in the neighbourhood of each mould, by measuring the temperature of the walls of the mould.

10. A process according to claim 1, comprising maintaining the temperature of the ventilating air substantially constant with respect to time.

11. A process according to claim 1, wherein said set temperature is constant in the course of a cycle of operation.

12. A process according to claim 1, wherein said set temperature is variable in the course of a cycle of operation.

13. A process according to claim 1, wherein said set temperature is constant on average with respect to time in a large number of cycles.

14. A process according to claim 1, wherein said set temperature is variable on average with respect to time in a large number of cycles.

15. A process for manufacturing glass objects comprising cyclically feeding a plurality of moulds in succession with parison elements of glass in a viscous liquid state, shaping and then discharging the shaped parison elements from the moulds, comprising feeding ventilating air to said moulds to cool said moulds, measuring the temperature of at least one of said moulds, comparing the measured temperature with a set temperature, and, when the measured temperature of said mould is higher than the set temperature, automatically causing direct injection of a cold fluid having a temperature substantially below ambient temperature into the ventilating air so as to lower the temperature of the mould to the neighborhood of the set temperature.

16. A process according to claim 5, wherein said cold fluid is a cold gas.

17. A process according to claim 16, comprising injecting said cold gas in a continuous manner.

18. A process according to claim 16, comprising injecting said cold gas in a sequential manner.

19. A process according to claim 16, comprising injecting said cold gas in a sequential and continuous manner.

20. A process according to claim 15, wherein said set temperature is constant in the course of a cycle of operation.

21. A process according to claim 15, wherein said set temperature is variable in the course of a cycle of operation.

22. A process according to claim 15, wherein said set temperature is constant on average with respect to time in a large number of cycles.

23. A process according to claim 15, wherein said set temperature is variable on average with respect to time in a large number of cycles.

24. A process for manufacturing glass objects comprising cyclically feeding a plurality of moulds in succession with parison elements of glass in a viscous liquid state, shaping and then discharging the shaped parison elements from the moulds, feeding ventilating air to said moulds to cool said moulds, cooling the ventilating air between substantially an instant when a shaped parison element is discharged from the mould and an instant when a following parison element enters the mould, while maintaining the temperature of the ventilating air substantially constant during the instant when the following parison element enters the mould and the instant when said following element has been shaped and is discharged from the mould.

25. A process according to claim 21, comprising cooling the ventilating air for a brief time shortly before discharging the parison element from the mould.

26. A process according to claim 24, comprising lowering the temperature of the ventilating air between substantially an instant when a shaped parison element is discharged from the mould and an instant when a following parison element enters the mould.

27. A process according to claim 26, comprising cooling the ventilating air for a brief time shortly before discharging the parison element from the mould.

28. A process according to claim 26, comprising maintaining the temperature of the ventilating air substantially constant between an instant when the following parison element enters the mould and an instant when said following element has been shaped and is discharged from the mould.

29. A process accoording to claim 28, comprising cooling the ventilating air for a brief time shortly before disoharging the parison element from the mould.

* * * * *